US008722201B2

(12) United States Patent
Schiebel et al.

(10) Patent No.: US 8,722,201 B2
(45) Date of Patent: May 13, 2014

(54) CONNECTIONS BETWEEN A MONOLITHIC METAL COMPONENT AND A CONTINUOUS-FIBER REINFORCED LAMINATE COMPONENT, AND METHOD FOR PRODUCTION OF THE SAME

(76) Inventors: Patrick Schiebel, Bremen (DE); Christoph Hoffmeister, Bremen (DE); Claus Thomy, Hambergen (DE); Axel Herrmann, Stade (DE); Frank Vollertsen, Bremen (DE)

( * ) Notice: Subject to any disclaimer, the term of this patent is extended or adjusted under 35 U.S.C. 154(b) by 584 days.

(21) Appl. No.: 13/119,364

(22) PCT Filed: Aug. 31, 2009

(86) PCT No.: PCT/DE2009/001221
§ 371 (c)(1),
(2), (4) Date: Apr. 25, 2011

(87) PCT Pub. No.: WO2010/031372
PCT Pub. Date: Mar. 25, 2010

(65) Prior Publication Data
US 2011/0206942 A1 Aug. 25, 2011

(30) Foreign Application Priority Data
Sep. 16, 2008 (DE) .......... 10 2008 047 333

(51) Int. Cl.
*B32B 5/02* (2006.01)
*B32B 5/22* (2006.01)
*B32B 15/04* (2006.01)
*B32B 15/14* (2006.01)
*B32B 15/20* (2006.01)
*B32B 37/00* (2006.01)
*B29C 65/00* (2006.01)
*B29C 70/00* (2006.01)
*B22D 19/04* (2006.01)
*B32B 37/06* (2006.01)
*B32B 38/00* (2006.01)

(52) U.S. Cl.
USPC ........... 428/621; 428/626; 428/622; 428/635; 428/650; 428/57; 428/58; 428/113; 428/114; 156/304.1; 156/242; 228/262.5; 228/1; 164/91; 264/241; 264/331.11; 264/332

(58) Field of Classification Search
USPC ......... 428/608, 607, 606, 615, 624, 626, 621, 428/622, 623, 635, 650, 660, 596, 597, 598, 428/614, 551, 545, 57, 58, 60, 61, 68, 74, 428/75, 113, 114, 457
See application file for complete search history.

(56) References Cited

U.S. PATENT DOCUMENTS

| 4,015,035 | A | 3/1977 | Blad et al. |
| 5,972,524 | A | 10/1999 | Childress |
| 6,280,584 | B1 | 8/2001 | Kumar et al. |
| 6,835,436 | B1 * | 12/2004 | Reif et al. ............ 428/119 |
| 7,521,105 | B2 | 4/2009 | Bech et al. |
| 2008/0131630 | A1 | 6/2008 | Schnelz |

FOREIGN PATENT DOCUMENTS

| DE | 41 00 044 A1 | 7/1992 |
| DE | 102007023836 A1 | 11/2008 |
| GB | 1081154 | 8/1967 |

OTHER PUBLICATIONS

International Search Report for International Application No. PCT/DE2009/001221, (Feb. 2010).

* cited by examiner

*Primary Examiner* — Michael E La Villa

(57) ABSTRACT

A connection is between a monolithic metal component and a continuous-fiber reinforced laminate component wherein the metal component and the laminate component are joined at the ends thereof. A method allows for the production of the connection between the monolithic metal component and the continuous-fiber reinforced laminate component.

25 Claims, 3 Drawing Sheets

CONNECTIONS BETWEEN A MONOLITHIC METAL COMPONENT AND A CONTINUOUS-FIBER REINFORCED LAMINATE COMPONENT, AND METHOD FOR PRODUCTION OF THE SAME

BACKGROUND

The present invention relates to a connection between a monolithic metal component and a continuous fiber reinforced laminate component and a method for production of the same.

The classic aluminum CFRP (carbon fiber reinforced plastic) joint connection predominantly used today is the rivet and bolt joint. For reasons of corrosion protection a CFRP laminate is to be provided in a supplementary manufacturing step with a separation layer of glass fiber. Advantages of a rivet connection lie in the high degree of experience and automation capacity in the assembly. Having regard to material utilization, however, a rivet connection constitutes an unsuitable joining method for fiber composite materials. The elements to be transferred, namely the fibers, are interrupted in a bore for a rivet. In addition, with an increasing anisotropy level ($E\|/E\bot$) there are very high notch stresses. In order to compensate, adaptations in the layer orientation and additional reinforcing layers are necessary in order to reduce the notch stress level with a then quasi-isotropic structure.

A further disadvantage in rivet connection is that the boring in the CFRP necessary for this brings with it a considerable wear of tools due to the heterogeneous material structure. Indeed, due to the necessary tolerances in the production of the rivet connection, both joining partners must often be bored through in a single work step. Particularly in case of CFRP with for example high tensile steels, however, there is no suitable wear protection for boring tools which protects both materials.

Adhesion technology has established itself as an alternative or as a supplement to the rivet connection of fiber composite structures. Example applications are found, inter alia, in the field of rail vehicle construction, the motor car industry, ship building and the construction of wind power plants. While the analysis of shear and peel stresses in adhesive connections is being researched, adhesion in aeronautical applications can, however, only be carried out and gain acceptance in a limited way due to the absence of a possibility of non-destructive testing. The adhesion of structural parts is additionally essentially limited to shell-form geometries and leads to large joining zones due to the necessary area of the joining partners.

Both in rivet or bolt connection and in adhesive connection a joining of overlapping materials arises. This has the disadvantage of a high construction height.

SUMMARY

It is thus an object of the invention to provide a connection between a monolithic metal component and a continuous fiber reinforced laminate component which has a smaller construction height with similar or even improved mechanical properties.

A connection between a monolithic metal component and a continuous fiber reinforced laminate component, comprises a first zone, in which metal wires or a metal lattice or a perforated plate is/are bonded through thermal joining or through a molding process to an end face of the metal component parallel to said end face, a second zone with a laminate layer structure, in which layers of the laminate component which extend from an end face of the laminate component are layered alternately with fibers, whereby the fibers comprise loops at one end which are fixed to the metal wires or to the metal lattice or to the perforated plate, and a transition zone with a laminate layer structure, in which the layers of the laminate component which extend from the end face of the laminate component are layered alternately with free ends of the fibers of the second zone, forming a transition.

In some embodiments of the invention, the laminate component can be a CFRP component. The monolithic metal component can also be made of aluminum. The thermal joining can in some embodiments comprise welding or soldering, and it is contemplated that the molding process in some embodiments will comprise casting. According to some contemplated embodiments of the invention, the fibers are carbon fibers, and the metal wires, the metal lattice or the perforated plate comprise titanium.

It is contemplated that the metal wires or the metal lattice or the perforated plate can be formed so that the fibers are not in contact with the metal component to help reduce or avoid corrosion. According to a particular embodiment of the invention, the metal component is a metal shell and the laminate component is a CFRP sandwich panel.

Some contemplated invention embodiments include a connection between a monolithic metal component and a continuous fiber reinforced laminate component, comprising a zone in which a metal laminate is bonded on the end face through thermal joining or a molding process to an end face of the metal component, and a transition zone with a metal fiber laminate layer structure, in which layers of the laminate component which extend from an end face of the laminate component are layered alternately with ends of the metal layers of the metal laminate, forming a transition.

In such embodiments, it is contemplated the laminate component can be a CFRP component, and the monolithic metal component can further be made of aluminum. According to some particular embodiments of the invention, the metal layers of the metal laminate consist of metal foils or sheets, which can also comprise titanium. Such embodiments can also incorporate thermal joining such as welding or soldering and further include a molding process that comprises casting. Such embodiments of the invention utilize a metal component that is a metal shell and a laminate component is a CFRP sandwich panel.

Furthermore, it is contemplated that the present invention provides a method for producing a connection utilizing fiber loops that are produced by means of a textile production process, preferably a tailored fiber placement process. The second zone can be soaked with a matrix simultaneously with a plastic injection process for the production of the laminate component.

The metal laminate can also be produced by means of a modified tape laying device. It can therefore be provided that the metal layers of the metal laminate are provided before production by means of such a tape laying device with an adhesive layer or simultaneously with the production with an adhesive film.

The invention recognizes that by providing load-bearing incorporated fiber elements or through integrated metal layers which are in turn associated with a force carrying metal composite, an end face joining of a monolithic metal component and a continuous fiber reinforced laminate component is facilitated, allowing for a reduction in construction height. The present invention provides integral material connections for fiber composite materials with metals which are characterized by a small construction space, low weight and the prevention of corrosion of the metal when using carbon fibers.

BRIEF DESCRIPTION OF THE DRAWINGS

Further features and advantages of the invention follow from the attached claims and the following description, in which multiple embodiments are explained individually in detail by reference to the schematic drawings, in which:

DETAILED DESCRIPTION

Figure 1:
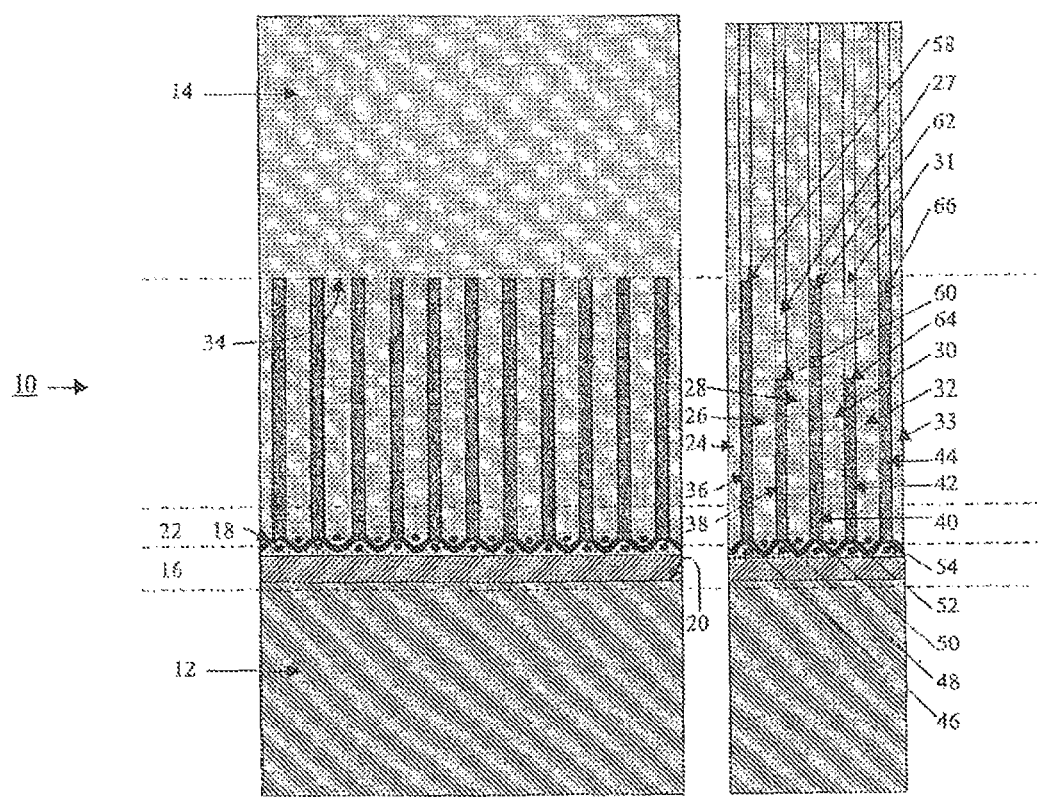
FIG. 1 depicts a top view (left) and a longitudinal sectional view (right) of a connection between a monolithic metal component and a continuous fiber reinforced laminate component according to one embodiment of the invention.

FIG. 1 shows a connection 10 between a monolithic metal component 12 made of aluminum and a continuous fiber reinforced laminate component 14 existing in the form of a CFRP component. The connection 10 comprises a first zone 16, in which a metal lattice is bonded by welding to an end face 20 of the metal component 12 parallel to said end face, a second zone 22 with a laminate layer structure, in which layers 24, 26, 28, 30, 32 and 33 of the laminate component 14 which extend from an end face 34 of the laminate component 14 are layered alternately with fibers 36, 38, 40, 42 and 44, whereby the fibers 36, 38, 40, 42 and 44 comprise at one end loops (fiber loops) 46, 48, 50, 52 and 54 which are fixed to the metal lattice 18, and a transition zone 56 with a laminate layer structure, in which the layers 24, 26, 28, 30 and 32 of the laminate component 14 which extend from the end face 34 of the laminate component, are layered alternately with free ends 58, 60, 62, 64 and 66 of the fibers 36, 38, 40, 42 and 44 of the second zone 22, forming a transition. "Forming a transition" is intended to mean in this case that a part of the free ends, namely the free ends 60 and 64, do not extend as far as the end face 34 of the laminate component 14, but that they are already previously relieved by layers 27 and 31.

It is contemplated that the fibers 36 to 44 can be carbon fibers. In addition the metal lattice 18 is formed so that the fibers 36, 38, 40, 42 and 44 are not in contact with the metal component 12.

The fiber loops 46, 48, 50, 52 and 54 pass the forces to be transferred for the connection 10 to the metal lattice 18. This can consist, for example, of titanium. In addition, the fiber loops 46 to 54 can be produced with a textile production process such as, for example, the tailored fiber placement process. In a small space, multiple shape-locking connections are produced with the metal lattice 18. This joint region can be soaked with a matrix simultaneously with a plastic injection process for the remaining laminate component 14 made of CFRP and can thus also transfer compressive forces.

The cross-section of the fiber loops 46, 48, 50, 52 and 54 can be adapted to the deformation behavior of the fiber bundles in order to fully utilize the material potential. Depending on specific application requirements, it is contemplated that perforated plates, individual wires, metal loops or eyes, or like structures can also be used instead of the metal lattice 18. As an alternative to the fiber loops 46 to 54 shown, textile meshes or also other textile bonding is/are possible.

In terms of construction, the connection can be dimensioned via the coordination of the individual elements and their geometries in such a way that having regard to light construction a local over-dimensioning is avoided. The type of failure and the origin of failure can be set and reliably executed.

With the connection described above (joint connection) very high loads can be transferred. The invention is superior to previous configurations in light construction having regard to construction space, weight, reliability and manufacturability. The construction space is clearly reduced in comparison with an adhesive connection as the necessary contact areas are relatively small.

Through the targeted use of different metals in the different zones, a corrosion between CFRP and, for example, aluminum can be avoided.

The second zone 22 can be produced by means of textile processes and thus be realized very quickly and economically. The inventive connection is thus clearly superior to previous connections for laminates and is suitable also for new applications, for example, CFRP components in motor car construction. Such connection also facilitates the end face joining of, for example, CFRP sandwich panels with metal shells. This is shown schematically in FIG. 3.

Figure 2:
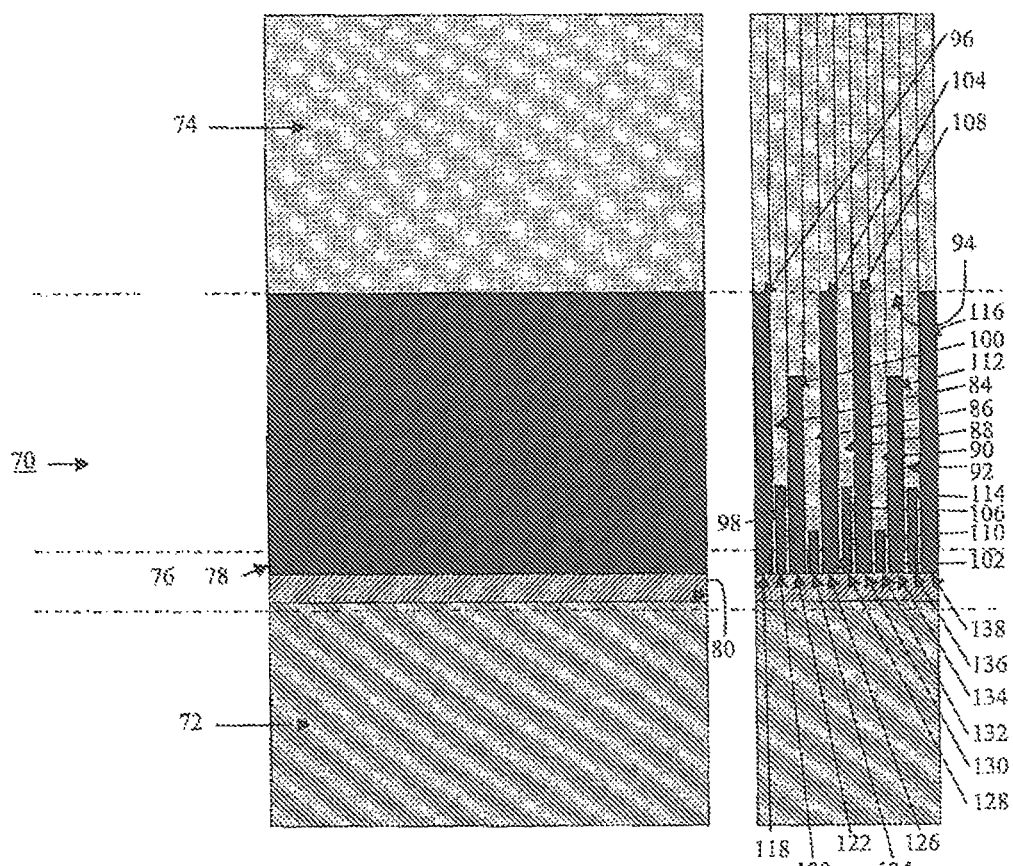
FIG. 2 depicts a top view (left) and a longitudinal sectional view (right) of a connection between a monolithic metal component and a continuous fiber reinforced laminate component according to a first particular embodiment of the invention.

FIG. 2 shows a connection 70 between a monolithic metal component 72 and a continuous fiber reinforced laminate component 74 according to a particular embodiment of the invention. The metal component 72 comprises aluminum and the laminate component 74 is a CFRP component. The connection 70 comprises a zone 76, in which a metal laminate 78 is bonded on the end face through welding to an end face 80 of the metal component 72, and a transition zone 82 with a metal fiber laminate layer structure, in which layers 84, 86, 88, 90 and 92 of the laminate component, which extend from an end face 94 of the laminate component 74 are layered alternately with ends 96, 98, 100, 102, 104, 106, 108, 110, 112, 114 and 116 of the metal layers 118, 120, 122, 124, 126, 128, 130, 132, 134, 136 and 138 of the metal laminate 78, forming a transition.

The metal layers 118 to 138 can comprise metal foils made of titanium. In the transition zone 82 the continuous fiber reinforced laminate component 74 made of CFRP transfers parts of the load to the metal foils. In addition the layers 84 to 92 run out and are replaced in teams of layers by further metal foils. The mechanical loads can thus continually go from one material to another.

In the zone 76 all layers 84 to 92 are replaced by metal foils and form here a metal plastic laminate. In addition the metal foils transfer in said zone 76 the forces to be transferred for the connection to the metal component 72. The joint area extends virtually over the entire cross-section of the zone 76.

The metal laminate 78 can be deposited in an automated way with modified tape layers, as used in CFRP production in prepreg technology. For this, either the metal foils used are previously provided with an adhesive layer or an adhesive film is applied in parallel in the lamination process.

By means of the layer-wise running-out of the metal layers or metal foils in the transition zone 82, a large connection area of the laminate component 74 to the metal component 72 can be achieved. By means of the large transition region, stress peaks can be avoided, as otherwise arise in material transitions.

In constructive terms, a connection can be dimensioned by means of coordination of the individual elements and their geometries in such a way that, having regard to light construction, a local over-dimensioning is avoided. The type of failure and the origin of the failure can be set and reliably executed.

An end face joining with metal joining partners is constructively useful (central load introduction, small construction space, aerodynamic areas).

Through tape laying devices the connection can be produced quickly and economically. The connection is thus clearly superior to current connections for laminate and is also suitable for new applications such as, for example, CFRP components in motor car construction. The integration of fiber composite laminates in existing metal structures is clearly simplified.

Figure 3:
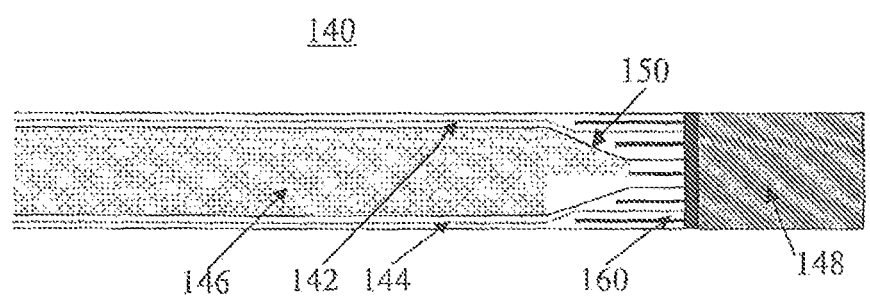
FIG. 3 depicts a longitudinal sectional view of a connection between a CFRP sandwich panel and a metal component.

FIG. 3 schematically depicts an inventive connection 160 between a CFRP sandwich panel 140 comprising two CFRP layers 142 and 144, between which a foam core 146 is sandwiched, and a metal component 148 made of aluminum, which is realized in the same way as the connection shown in FIG. 2. The sandwich panel 140 merely does not comprise—unlike the laminate component 74 made of CFRP in FIG. 2—a planar end face but instead a conically extending end face 150.

The features of the invention disclosed in the above description, in the drawings and in the claims can be essential both individually and in any combinations for the realization of the invention in its various embodiments.

The invention claimed is:

1. A connection between a monolithic metal component and a continuous fiber reinforced laminate component comprising:
    a first zone in which at least one of a metal lattice, metal wires, and a metal perforated plate is bonded, through at least one of a thermal joining and a molding process, to an end face of said metal component parallel to said end face of said metal component;
    a second zone with a laminate layer structure in which layers of said laminate component, which extend from an end face of said laminate component, are layered alternately with fibers, said fibers comprising loops at one end which are fixed to said at least one of a metal lattice, metal wires, and a perforated plate; and
    a transition zone with a laminate layer structure in which layers of said laminate component, which extend from an end face of said laminate component, are layered alternately with free ends of said fibers of said second zone, forming a transition.

2. The connection of claim 1 wherein said laminate component further comprises carbon fiber reinforced plastic.

3. The connection of claim 1 wherein said monolithic metal component further comprises aluminum.

4. The connection of claim 1 wherein said thermal joining comprises at least one of welding and soldering.

5. The connection of claim 1 wherein said molding process comprises casting.

6. The connection of claim 1 wherein said fibers being carbon fibers.

7. The connection of claim 1 wherein said at least one of a metal lattice, metal wires, and a metal perforated plate are titanium.

8. The connection of claim 1 wherein said at least one of a metal lattice, metal wires, and a metal perforated plate are formed so that the fibers are not in contact with said metal component.

9. The connection of claim 1 wherein said metal component is a metal shell and said laminate component is a carbon fiber reinforced plastic sandwich panel.

10. A connection between a monolithic metal component and a continuous fiber reinforced laminate component comprising:
    a zone in which a metal laminate is bonded on an end face of said metal laminate through at least one of thermal joining and a molding process to an end face of said metal component; and
    a transition zone with a metal and fiber laminate layer structure in which layers of said laminate component which extend from an end face of said laminate component are layered alternately with ends of metal layers of said metal laminate forming a transition.

11. The connection of claim 10 wherein said laminate component further comprises carbon fiber reinforced plastic.

12. The connection of claim 10 wherein said monolithic metal component further comprises aluminum.

13. The connection of claim 10 wherein said metal layers of said metal laminate comprise at least one of metal foils and sheets.

14. The connection of claim 13 wherein said at least one of metal foils and sheets further comprise titanium.

15. The connection of claim 10 wherein said thermal joining comprises welding or soldering.

16. The connection of claim 10 wherein said molding process comprises casting.

17. The connection of claim 10 wherein said metal component is a metal shell and said laminate component is a carbon fiber reinforced plastic sandwich panel.

18. A method for producing a connection between a monolithic metal component and a continuous fiber reinforced laminate component comprising:
    providing a first zone in which at least one of a metal lattice, metal wires, and a metal perforated plate is bonded, through at least one of a thermal joining and a molding process, to an end face of said metal component parallel to said end face of said metal component;
    providing a second zone with a laminate layer structure in which layers of said laminate component, which extend from an end face of said laminate component, are layered alternately with fibers, said fibers comprising loops at one end which are fixed to said at least one of a metal lattice, metal wires, and a perforated plate; and
    providing a transition zone with a laminate layer structure in which layers of said laminate component, which extend from an end face of said laminate component, are layered alternately with free ends of said fibers of said second zone, forming a transition.

19. The method for producing a connection of claim 18 wherein said fiber loops are produced by a textile production process.

20. The method for producing a connection of claim 18 wherein said fiber loops are produced by a textile production process that is a tailored fiber placement process.

21. The method for producing a connection of claim 18 wherein said metal component is a metal shell and said laminate component is a carbon fiber reinforced plastic sandwich panel.

22. The method for producing a connection of claim 21 wherein said second zone is soaked with a matrix simultaneously with a plastic injection process for the production of said laminate component.

23. A method for producing a connection between a monolithic metal component and a continuous fiber reinforced laminate component comprising:
    providing a zone in which a metal laminate is bonded on an end face of said metal laminate through at least one of thermal joining and a molding process to an end face of said metal component; and
    providing a transition zone with a metal and fiber laminate layer structure in which layers of said laminate component which extend from an end face of said laminate component are layered alternately with ends of metal layers of said metal laminate forming a transition.

24. The method for producing the connection of claim 23 further comprising producing said metal laminate by means of a modified tape laying device.

25. The method for producing the connection of claim 23 further comprising providing said metal layers of said metal laminate by means of a tape laying device with an adhesive layer or simultaneously with the production with an adhesive film.

\* \* \* \* \*